United States Patent [19]

Rau et al.

[11] Patent Number: 5,276,826
[45] Date of Patent: Jan. 4, 1994

[54] APPARATUS FOR TRANSFORMING ADDRESSES TO PROVIDE PSEUDO-RANDOM ACCESS TO MEMORY MODULES

[75] Inventors: Bantwal R. Rau, Los Gatos; Michael S. Schlansker, Sunnyvale, both of Calif.

[73] Assignee: Hewlett-Packard Company, Palo Alto, Calif.

[21] Appl. No.: 742,442

[22] Filed: Aug. 5, 1991

Related U.S. Application Data

[63] Continuation of Ser. No. 140,407, Jan. 4, 1988, abandoned.

[51] Int. Cl.$^5$ ............................................. G06F 12/06
[52] U.S. Cl. ............................... 395/400; 395/425; 364/DIG. 1; 364/246.4; 364/252; 364/254.4; 364/255.1
[58] Field of Search .......... 395/400, 425; 364/DIG. 1, DIG. 2; 364/200; 300; 900

[56] References Cited

U.S. PATENT DOCUMENTS

| | | | |
|---|---|---|---|
| 3,675,215 | 7/1972 | Arnold et al. | 395/425 |
| 4,051,551 | 9/1977 | Lawrie et al. | 364/200 |
| 4,189,767 | 2/1980 | Ahuja | 395/425 |
| 4,215,402 | 7/1980 | Mitchell et al. | 364/200 |
| 4,254,463 | 3/1981 | Busby et al. | 364/200 |
| 4,318,175 | 3/1982 | Hawley | 364/200 |
| 4,322,815 | 3/1982 | Broughton | 395/775 |
| 4,356,549 | 10/1982 | Chueh | 364/200 |
| 4,380,797 | 4/1983 | Desyllas et al. | 364/200 |
| 4,400,768 | 8/1983 | Tomlinson | 364/200 |
| 4,433,389 | 2/1984 | York et al. | 364/900 |
| 4,464,713 | 8/1984 | Benhase et al. | 364/200 |
| 4,484,262 | 11/1984 | Sullivan et al. | 364/200 |
| 4,511,964 | 4/1985 | Georg et al. | 364/200 |
| 4,539,637 | 9/1985 | DeBruler | 364/200 |
| 4,550,367 | 10/1985 | Hattori et al. | 364/200 |
| 4,707,781 | 11/1987 | Sullivan et al. | 364/200 |
| 4,736,287 | 4/1988 | Druke et al. | 364/200 |
| 4,754,394 | 6/1988 | Brantley, Jr. et al. | 364/200 |
| 4,833,599 | 5/1989 | Colwell et al. | 364/200 |
| 4,920,477 | 4/1990 | Colwell et al. | 364/200 |
| 4,980,822 | 12/1990 | Brantley, Jr. et al. | 364/200 |
| 5,036,454 | 7/1991 | Rau et al. | 395/375 |
| 5,083,267 | 1/1992 | Rau et al. | 395/375 |
| 5,111,389 | 5/1992 | McAuliffe et al. | 395/800 |
| 5,121,502 | 6/1992 | Rau et al. | 395/800 |
| 5,133,061 | 7/1992 | Melton et al. | 395/425 |

OTHER PUBLICATIONS

Carter et al., "Class of Fast Hash Functions Using Exclusive Or,"IBM Tech Disc. Bull., vol. 19, No. 12, May, 1977, pp. 4822-4823.

J. M. Frailong, W. Jalby and J. Lenfant, "XOR-Schemes: A Flexible Data Organization in Parallel Memories", Proc. of the 1985 Int'l. Con. on Parallel Processing, pp. 276-283, Aug. 1985.

B. R. Rau, C. D. Glaeser and R. L. Picard, "Efficient Code Generation for Horizontal Architectures: Compiler Techniques and Architectural Support"; IEEE, 1982, pp. 131-139.

B. R. Rau and C. D. Glaeser, "Some Scheduling Techniques and an Easily Schedulable Horizontal Architecture for High Performance Scientific Computing", IEEE, 1981, pp. 183-198.

A. Norton and E. Melton, "A Class of Boolean Linear Transformations for Conflict-Free Power-of-Two Stride Access", Proceedings of the 1987 International Conference on Parallel Processing, pp. 247-254, 1987.

*Primary Examiner*—Thomas C. Lee
*Assistant Examiner*—Matthew C. Fagan

[57] ABSTRACT

A computer system having a multi-module memory system. Accesses to the memory modules for reading or writing are undertaken in parallel. The memory system is addressed by input addresses. The memory system includes a map unit for transforming the input addresses to output addresses in a pseudo-random manner so as to tend to distribute memory accesses uniformly among the memory modules whereby contention resulting from multiple concurrent attempts to access the same memory module is reduced. The map unit performs addresses transforms that are repeatable so that the same input address maps to the same output address and that are one-to-one such that each input address maps to one and only one output address.

6 Claims, 5 Drawing Sheets

APPARATUS FOR TRANSFORMING ADDRESSES TO PROVIDE PSEUDO-RANDOM ACCESS TO MEMORY MODULES

This application is a continuation of U.S. patent application Ser. No. 07/140,407, filed Jan. 4, 1988, now abandoned. This application is related to the following applications:

- U.S. patent application Ser. No. 07/342,649, now U.S. Pat. No. 5,036,454;
- U.S. patent application Ser. No. 07/456,627, now U.S. Pat. No. 5,083,267;
- U.S. patent application Ser. No. 07/462,301, now U.S. Pat. No. 5,121,502;
- U.S. patent application Ser. No. 07/677,600 (filed Jan. 27, 1991), which is a continuation of U.S. patent application Ser. No. 07/045,896, now abandoned; and
- U.S. patent application Ser. No. 07/445,136 (filed Nov. 30, 1989), which is a continuation of U.S. patent application Ser. No. 07/296,415, now abandoned, which in turn is a continuation of U.S. patent application Ser. No. 07/045,895, now abandoned.

BACKGROUND OF THE INVENTION

The present invention relates to computers, and more particularly, to high-speed, parallel-processing computers employing horizontal architectures and multi-module memory systems.

Horizontal processors have been proposed for a number of years. See for example, "SOME SCHEDULING TECHNIQUES AND AN EASILY SCHEDULABLE HORIZONTAL ARCHITECTURE FOR HIGH PERFORMANCE SCIENTIFIC COMPUTING" by B. R. Rau and C. D. Glaeser, *IEEE Proceedings of the 14th Annual Microprogramming Workshop*, Oct. 1981, pp 183-198 Advanced Processor Technology Group ESL, Inc., San Jose, Calif., and "EFFICIENT CODE GENERATION FOR HORIZONTAL ARCHITECTURES:COMPILER TECHNIQUES AND ARCHITECTURAL SUPPORT" BY B. Ramakrishna Rau, Christopher D. Glaeser and Raymond L. Picard, IEEE 9th Annual Symposium on Computer Architecture 1982, pp. 131-139.

Horizontal architectures have been developed to perform high speed scientific computations at a relatively modest cost. As a consequence of their simplicity, horizontal architectures are inexpensive when considering the potential performance obtainable. This potential performance is realized when the multiple resources of a horizontal processor are scheduled effectively. An example of one horizontal computer is described in the above cross-referenced application and the applications referenced therein.

In computer systems, the processing units execute programs which require accesses to the memory system. Some of the accesses to the memory system are read (fetch) operations in which information from an address location in the memory system is accessed and returned to the processing unit for use in further execution of the program. In statically scheduled computer systems, the return of the accessed information in response to a request from the processing unit is in a predetermined order and at a predetermined time. Generally, information is returned to the processing unit from the memory system in the same order that the processing unit makes a request for the information.

It is often necessary or desirable in computer systems for one or more ports (from one or more processing units, I/O devices or other system units) to simultaneously initiate accesses (by generating memory addresses) to a shared memory system for fetching and storing information. The amount of time required to return requested information from a memory system to the processing unit after a request for the information by the processing unit is the actual latency time of the memory. The memory latency time affects the overall efficiency in which the processing unit can complete the execution of programs. In general, it is desirable to have the actual memory latency as short as possible so that the processing unit is not required to wait for the memory system in order to continue processing.

In order to increase system speed, memory systems have been constructed using interleaved memory modules. The use of multiple memory modules increases the bandwidth of the memory system by directing successive memory requests to different ones of the memory modules. Since a request directed to one module can be processing at the same time that a request is processing at another module, the rate at which the memory system can return requested information is greater than the rate of any individual module. For this reason, the memory system has a higher bandwidth as a result of using multiple memory modules operating in parallel.

As speed requirements of computers have increased, memory systems employing greater numbers of parallel memory modules have been developed. However, merely increasing the number of memory modules does not guarantee higher memory speed or a higher number of memory accesses during a period of time. The number and speed of total memory accesses is limited by the conflicts that occur in accessing the individual memory modules.

Memory modules are usually constructed so that requests to access a memory module, in response to a sequence of input addresses, can only be accommodated one address at a time in sequential order. Multiple requests to a single memory module must have a conflict resolution mechanism that orders the requests. Theoretically, the number of memory modules can be increased in order to reduce such conflicts but, in conventional systems, the total achievable rate of accesses to a memory system does not increase in proportion to an increase in the number of memory modules forming the system.

In a conventional multi-module memory system, part of the input address, Ai, to the memory system defines the particular one of the memory modules in which the physical address is actually located. Let M be the number of memory modules, where $M = 2^m$ and m is an integer. Typically, m contiguous bits of a given input address Ai specify which one of the M memory modules includes the physical address Ai. In one example where m equals 6 and M equals 64, sixty-four memory modules exist and six of the input address bits, for example Ai(7, 2), uniquely define one of the 64 memory modules.

When an input sequence, Ai($), of input addresses Ai, where $ is the index from 0 to $max of Ai, is presented to a memory system, it is desirable that the physical addresses in the memory modules be uniformly distributed and not clustered. If the distribution in response to that input sequence tends to be random, then generally the distribution will be uniform among the memory modules. Such a distribution is called pseudo random. When the distribution tends to be random, the probability that a memory module will be busy when an input address makes a request to that module is lower than when not random. If the memory module is not busy when a request is made, then of course the memory system operates more quickly since time is not lost in waiting for the memory module to become not busy. Therefore, in general, memory systems suffer a loss in speed from memory access conflicts when a higher frequency of accesses results for some of the memory modules relative to the frequency of accesses for other of the memory modules.

A pseudo random distribution of accesses among memory modules is important for both short address sequences and for long address sequences. For example with 64 memory modules and for a short sequence with S from 0 to 63, representing 64 different input addresses Ai in the input sequence Ai(S), it is desirable that the physical addresses (that is, the physical module actually having the address location) be distributed one each in each of 64 different memory modules. Similarly, for a long sequence (With S much larger than 64), it is desirable that each of the 64 memory modules tends to have an equal number of physical addresses in response to the input addresses irrespective of the nature of the input sequence of addresses.

While it is desirable to access all memory modules uniformly with equal frequency, certain types of programs generate input address sequences that address memory modules in a manner that tends to cause non-uniform accessing among the memory modules. Such non-uniform memory accessing frequently arises in performing matrix computations. For example, a two-dimensional matrix might have its matrix values stored with column values in a single memory module. With such storage, row matrix values and forward-diagonal and reverse-diagonal matrix values can be accessed from different memory modules. However, When the column matrix values are accessed serially out of the single memory module the accessing rate is materially reduced because of the module access conflicts which arise.

In order for an interleaved memory system to be effective and have accesses uniformly distributed among the memory modules, the organization of addresses in the memory modules must be appropriately determined.

The typical organization of an interleaved memory system uses m contiguous bits of the input address to define the memory module. Such an organization has every M-th word assigned to a given memory module, where M is the number of memory modules. Usually, M is a power of 2. Less frequently, M is some other number such as a prime. Such a prime number memory system is described, for example, in U.S. Pat. No. 4,051,551 to Lawrie et al. With such organizations, however, input address sequences Ai(S) are found, in actual practice, that map non-uniformly and more frequently to the same module and therefore, the full benefits expected from interleaving are not achieved.

Another memory system organization uses m non-contiguous bits from the input address (where $M=2^m$) and assigns all words with the same addresses in those m bits to the same memory module. This non-contiguous address bit organization is not susceptible to as long-term a concentration of references to one module as the previous m contiguous bit approach. However, when m is much less than the number of address bits (which is almost always the case), there is still a susceptibility to a short-term concentration of references to a module.

In one example of a memory system where $m=6$ and the number of bits in the word address is 29, the number of contiguous address bits which do not enter into the determination of the selected memory module cannot be guaranteed to be less than 4. A contiguous set of not more than 4 bits is achieved if the 6 bits that are used are evenly distributed throughout the 29 address bits. Even with such a distribution, however, there can be at least 16 consecutive references to the same memory module when the appropriate stride exists in the input address sequence. This short-term (up to 16 in the example described) non-uniform concentration of references to the same memory module is as detrimental to performance (assuming realistic queueing buffer capacities) as is a long-term non-uniform concentration.

Methods for avoiding non-uniform accesses among memory modules have been proposed which use address transforms. In connection with address transforms, the terms "real address" and "input address" are used to refer to the address presented to the memory system prior to an address transform and the terms "physical address" and "output address" are used to refer to the address after transform.

In connection with an address transform, each input address, Ai, is transformed by a transform, H, to form an output address, Ao. In this specification, the number of bits, I, for an input address is designated in parentheses, Ai(I-1, I-2, ..., 0). For example, with 29 addresses bits (I=29) the designation is Ai(28, ..., 0), and similarly, the number of bits in a transform output address is indicated for the same 29 bit example as Ao(28, ..., 0).

In general, the expression for the transform of a single input address Ai to a single output address Ao is given as follows:

$$Ai[H]=Ao \qquad \text{Eq.(A)}$$

A number of bits, usually m consecutive bits, of the output address Ao defines the particular one of the memory modules in which the output address is physically located. Usually $2^m$ memory modules are defined. In one example where 64 memory modules exist, the output address bits Ao(7, ..., 2) uniquely defines one of the 64 memory modules. The transform of the input address Ai to form the output address Ao frequently uses g of the I input address bits in determining the output address module bits Ao(7, ..., 2). The number g of input address bits is usually greater than m of output address bits. In one example, the memory modules are addressed on a word basis and the low-order b address bits Ai(1,0) and Ao(1,0) define the byte address within a word.

A sequence of input addresses, each input address of the form Ai, is designated as Ai{S} and, with a transform, H, a sequence of output addresses Ao{S} is formed where each output address of the form Ao all given as follows:

$$[Ai\{S\}][H]=Ao\{S\} \qquad \text{Eq.(B)}$$

where,
  Ai = input address
  Ai{S} = sequence of Smax input addresses indexed from 0 to (Smax − 1)

H = address transform
Ao = output address of a memory module
Ao{S} = sequence of output addresses indexed from 0 to (Smax−1)

In Eq.(B) the sequence Ai{S} of input addresses Ai presented to a memory system is indexed from 0 to (Smax−1) and the sequence Ao{S} of output addresses Ao similarly is indexed from 0 to (Smax−1). For a 29-bit example, the designation is Ai(28, . . . ,0){S} and Ao(28, . . . ,0){S}.

When sequences of input addresses Ai(S) are transformed to sequences of output address Ao(S), it is desirable that the distribution of the output addresses into physical memory modules tends to be random, that is, pseudo-random. For example, for the sequence S indexed from 0 to 63, representing 64 different input addresses in the input sequence Ai(S), it is desirable that the output addresses be distributed one each in each of the 64 memory modules. Similarly, as Smax grows much larger than 64, it is desirable that each of the 64 memory modules tends to have an equal number of output addresses Ao resulting from the input addresses Ai irrespective of the nature of the input sequence Ai(S) of input addresses.

In general, the function of an address transform is to assign the location of physical addresses in storage to memory modules so that no non-artificial sequence of input addresses exhibits statistically more frequent long-term or short-term accesses to individual memory modules.

Also for an effective transform, the rate of accesses to memory modules will increase in proportion to an increase in the number of memory modules with substantial independence of any non-artificial memory referencing pattern established by the input sequence of memory input addresses.

One example of an address transform is described in U.S. Pat. No. 4,484,262 to Sullivan et al. In that patent, a truly random address transform was described which did not disclose a mechanism that insured the repeatability or one-to-one mapping properties that are required for practical systems.

Transform repeatability insures that the same input (real) address always maps to the same output (physical) address. This property is useful in a computer system so that different requests to the memory system are assured of accessing the same memory location. In a practical computer system, it is desirable that the transform mapping not be truly random, but rather be deterministic and therefore can be described as pseudo-random.

Transform one-to-one mapping insures that no more than one input (real) address maps to the same output (physical) address. This property is useful in a computer system to insure that information which is needed in the system is uniquely defined and not confused with or destroyed by other information. However, there may be output (physical) addresses with no corresponding input (real) addresses in some computer systems.

In accordance with the above background, it is an objective of the present invention to provide an improved computer system which provides address transforms that avoid consecutive references to the same memory module for many different types of input address sequences so that a uniform distribution of accesses occurs among memory modules.

SUMMARY

The present invention is a computer system having a multi-module memory system. Accesses to the memory modules for reading or writing are undertaken in parallel when the accesses are not dependent on the completion of a previous access.

The memory modules are addressed by input addresses. The memory system includes a map unit for transforming the input addresses to output addresses in a pseudo-random manner so as to tend to distribute memory accesses uniformly among the memory modules whereby contention resulting from multiple concurrent attempts to access the same memory module is reduced.

The map unit performs address transforms that are repeatable so that the same input address maps to the same output address and that are one-to-one such that each input address maps to one and only one output address.

In some embodiments, address transforms desirably have one or more of the following properties:

An equal number of input addresses are mapped into each memory module.

The mapping is onto, that is, some input address will map into any given output address.

The concentration in any particular memory module of output addresses in response to any sequence of input addresses is not greater than would be the case with a truly random output address sequence irrespective of the nature of the input address sequence. The distribution of output addresses in memory modules tends to be uniform among the memory modules for both short and long sequences of input addresses.

The mapping is effective over the entire range of interleaving for which the memory system is designed including 2-way, 4-way, 8-way, 16-way or other interleaving.

The circuitry for computation of the output addresses is inexpensive and operates efficiently in time.

In one particular embodiment, the output addresses Ao {for example, bits Ao(7, . . . ,2)} are randomized based upon g of the I input address bits where g can include many or all of the input address bits {for example, Ai(28, . . . ,2)}. Certain of the input address bits [for example, the n-m address bits Ai(28, . . . ,8)} are unchanged by the transform to reduce the expense of the transform hardware. When the m module input address bits (for example, Ai(7, . . . ,2)} go through all combinations holding the non-module n-m input address bits {for example, Ai(28, . . . ,8)} constant, the m module output address bits (for example, Ao(7, . . . , 2)} also go through all combinations, that is, the transformation is a permutation. This constraint guarantees the one-to-one property. However, for different combinations of non-module input address bits {for example, Ai(28, . . . , 8)}, the permutation of the input module address bits onto the output module address bits {for example, Ai(7, . . . , 2) onto Ao(7, . . . , 2)} will be different as a function of the non-module input address bits {for example, Ai(28, . . . , 8)}.

The address transform of the present invention is effective for many difficult types of input address sequences including matrix sequences, arithmetic sequences, Fast Fourier Transform (FFT) sequences (and other arithmetic sequences with bit reversal), random but spatially localized sequences, and composite sequences obtained by merging sequences of the above types.

In accordance with the above summary, the present invention achieves a improved computer system which provides address transforms that avoid consecutive references to the same memory module for many different types of address sequences.

DETAILED DESCRIPTION

General

Figure 1:
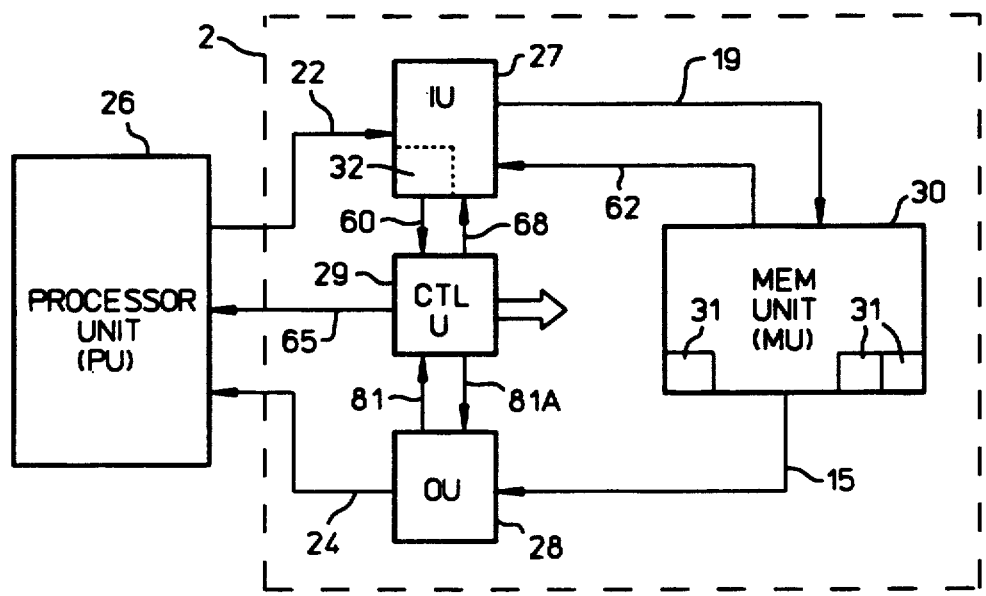
FIG. 1 depicts a general block diagram of a system incorporating the present invention.

The pseudo-random address transforms that achieve the objectives of the present invention can be obtained in numerous ways. For example, table look-up, control logic or other circuitry can be employed in making the address transforms.

One important parameter for establishing a transform with the desired properties is the number of input address bits that are used in the transform to form the output address bits. In general, the number of input address bits used in the transform should be large. The need for a large number of input address bits is understood with respect to a specific example.

In the example, an address transform uses a small number of the bits from the input address to form a transformed output address. Assume for the example that m bits from the input address are utilized and that there are $2^m$ memory modules. Typically m is 6 and 64 memory modules exist. In a table look-up embodiment, the m input address bits are used to index into a table with $2^m$ entries, each m bits wide. The contents of the table are the numbers 0 through $2^m - 1$ arranged in some pseudo-random permutation. The selected entry from the table is used to replace the m bits in the input address that were used as the index to the table to form the output address.

The m-bit example where m is small is susceptible to the problem of short-term, non-uniform distribution of output addresses in the $2^m$ memory modules. In general, for a constant stride in the input addresses, only a subset of the entries in the lookup table are used. The subset of entries is related to the stride and will map into a subset of the memory modules. Since only a subset of modules will be repeatedly referenced by the input address sequence, the distribution of addresses among all the memory modules is non-uniform.

In order to avoid the problem, many and sometimes all, of the input address bits are used in the transform that determines the output address and particularly the memory module. The use of a large number of address bits guarantees that regardless of where in the input address the "activity" is (in terms of bits changing from input address to input address in the input address sequence), the physical module output address will continue to change also thereby providing the desired uniform distribution of output addresses among the memory modules.

The desired result is achieved, for example, with a table using all or a large number of bits in the input address to index the table to provide output addresses m bits wide, but with different permutations.

Address Transform Using The XOR Function

Let the randomized bits that replace the input address module bits (for example $Ai(7, \ldots, 2)$) be designated as the output address module bits {for example $Ao(7, \ldots, 2)$}.

The transform function for transforming the input address bits to the output module address bits is specified, for the example described, by the Boolean matrix $H[2, \ldots, 28; 2, \ldots, 7]$ where $H[j,k] = 1$ if and only if $Ai(j)$ is an input to the EXCLUSIVE-OR (XOR) gate having the output $Ao(k)$. The Boolean matrix $H[j,k]$ more generally has j ranging from a low value, J1, to a high value, Jh, and has k ranging from a low value, K1, to a high value, Kh. Therefore $H[j,k]$ is given by $H[J1, \ldots, Jh; K1, \ldots, Kh]$.

Define $S(n,j)$, the n-square sub-matrix of $H[j,k]$, to be of the form $$\begin{bmatrix} H[j,K1 + (n-1)] & \ldots & H[j,K1] \\ \cdot & & \cdot \\ \cdot & & \cdot \\ \cdot & & \cdot \\ H[j + (n-1), K1 + (n-1)] & \ldots & H[j + n - 1, K1] \end{bmatrix}$$

$1 < n \leq Kh - (K1 - 1)$ and $J1 \leq j \leq Jh - (n-1)$

In the example described where $J1=2$, $Jh=28$, $K1=2$ and $Kh=7$, $S(n,j)$, the n-square sub-matrix of $H[j,h]$ is given as follows:

$$\begin{bmatrix} H[j, n + 1] & \ldots & H[j, 2] \\ \cdot & & \cdot \\ \cdot & & \cdot \\ \cdot & & \cdot \\ H[j + n - 1, n + 1] & \ldots & H[j + n - 1, 2] \end{bmatrix}$$

where $1 < n < 7$ and $1 < j < 28 - n$.

1. So that the high order bits of the input address may be used without any further computation, it is required that $S(6,2)$ be non-singular, that is, all six rows are linearly independent. This ensures that when $Ai(7, \ldots, 2)$ go through all 64 combinations while holding $Ai(28, \ldots, 8)$ constant, $Ao(7, \ldots, 2)$ will go through all 64 combinations. In other words, the randomization of the 6 bits is a (potentially different) permutation for each value of $Ai(28, \ldots, 8)$.

2. So that there is equi-distribution of the words across banks (for example where the number of banks equals 4) and memory modules (for example, where the number of memory modules equals 8, 16, 32, or 64), $S(n,2)$, $1 < n < 7$, should be non-singular.

3. If every $S(n,j)$, $1 < n < 7$, $1 < j < 28 - n$, is non-singular, then for any stride that is a power of 2, perfect equi-distribution is obtained.

The XOR transform as defined above is an improvement for many types of input address sequences. However, even additional improvement is possible when the particular XOR function is selected carefully. Particular ones of the XOR transforms generally defined above cause problems of non-uniform address distribution among memory modules for certain input address sequences. For example, input addresses in sequences with strides which have multiple 1's in their binary representation can be transformed in a manner which results in non-uniformity. If rows in the H matrix are repeated, certain input address strides with multiple 1's can cause those H matrix rows that are repeated to cancel thereby resulting in a transform which repeatedly addresses the same memory module. The multiple 1's problem is avoided by using an H matrix having non-singularity of the n-square matrices after H has been XOR-ed with itself down by the number of rows related to the stride.

Address Transform Using Polynomial Arithmetic

There are two theoretically understood ways of creating a pseudo-random, uniformly distributed mapping from the integer domain defined by real (input) addresses to a finite size integer range which defines the physical (output) addresses of memory modules. Both of these ways involve computing the modulus of the argument of the input integer. In one way, integer arithmetic is used. In the other, polynomial arithmetic is used. Polynomial arithmetic uses XOR logic and can readily handle the case of a power-of-two number of memory modules and accordingly is usually the preferred way.

Computation of the remainder in polynomial arithmetic is equivalent to a hash table transform where row i in the table is the remainder obtained when $2^i$ is divided by the modulus polynomial. The computation is related to a linear finite-state feedback register having feedback coefficients obtained from the modulus polynomial by deleting the highest order term. The successive states of the shift register are the rows of the hash table.

For a polynomial, p, of order n, if the polynomial is prime and primitive, $x(2^{n-1})+1$ is the smallest two-coefficient polynomial that is divisible by p. This means that the rows of the hash table will cycle with a period of $2^n - 1$.

In the subsequent discussion, an operator followed by a "!" represents the polynomial arithmetic equivalent of the arithmetic operator.

For such a p (with m=6), consider the polynomial arithmetic sequence s *!i, for i=1, 2, ..., where s is the stride. This sequence will map into the sequence (s *!i) mod! p. which in turn is equal to the sequence ((s mod! p) *! (i mod! p)) mod! p.

Since p is prime and primitive, all the integers mod1 p map into either 0 or alphai, i=1, 2, ..., 2n−1, depending on whether the integer is divisible by p or not, where alpha is the polynomial x. Therefore, if s is prime relative to p, the cyclic sequence i mod! p is merely phase shifted when multiplied by s mod! p. This makes the computation of the sequence (s *! i) mod! p equivalent to rotating the rows of the hash table down by some fixed amount and computing the hash output for the sequence i, i=0, 1, 2, ..., that is, the stride s is accounted for by a rotation of the rows of the hash table. If s is a multiple of p, (s *! i) mod! p will map to 0 for all i.

Now consider the integer arithmetic sequence ( s * i), which maps into the sequence (s * 1) mod! p. The effect of using the integer multiply instead of the polynomial multiply is that the ripple-carry (which is absent in polynomial arithmetic) is equivalent to the polynomial addition, every so often, of some number. In the case of an s that is relatively prime to p (in polynomial terms), this effect further randomizes the hash function.

In the case of an s that is a polynomial multiple of p, this ripple-carry effect may cause equi-distribution, albeit with more clustering in time than is desirable. This clustering in time is minimized by avoiding too many contiguous zero coefficients in the polynomial p or in any polynomial arithmetic multiple of p.

Address Transform Generation

A specific example of a transform generated in accordance with polynomial arithmetic is presented in TABLE A. In connection with TABLE A, a shift register of order 6 is implied which includes the stages S5, S4, ..., S0. The shift register is organized, for example, under the column labeled STAGES with the low-order S0 stage on the right and the high-order S5 stage on the left. Bits stored in each of the stages are shifted from right to left one bit position for each count as indicated in the count column labeled C starting with count 2.

In TABLE A starting with count 2, the data in each of the stages of TABLE A is shifted from right to left starting with a 1 in the low-order stage in count 2. In each of the counts 3 through 7, the 1 introduced into the shift register stage S0 in count 2 is shifted through the high-order stages. After count 7, the in the high-order S5 stage produces a carry-out which causes the feedback coefficient to be XOR'ed with the contents of the shift register stages. The XOR operation only occurs when there is a carry-out of a logical 1 from the highest-order S5 stage of the shift register. When no carry-out occurs, the value in each stage is merely shifted left and stored in the next higher-order stage. Whenever a carry-out does occur from the highest-order S5 stage, the value of each stage includes the XOR of the feedback coefficient, on a bit-by-bit basis, with the next lower-order stage of the shift register. The 1 value from the S5 highest-order stage is XOR'ed with the lowest-order coefficient value whenever a carry out occurs In the example of TABLE A, the feedback coefficient is 100111. With this coefficient, referring to count 8, the in the low-order S0 stage results from the XOR of the 1 carry-out from the highest-order S5 stage of count 7 with the 0 which is a constant input to the S0 stage. The 10011 values in the stages S5, S4, ..., S1 occur as a result of the bit-by-bit XOR of the values 00111 with the 00000 contents of the stages S4, S3, S2, S1, S0 during count 7.

With the operation carried out as described, the values of the shift register for counts 2 through 64 are shown in TABLE A.

TABLE A order: 6
feedback coefficients: 100111
first state: 000001

| STAGES | C |
|---|---|
| 543210 | |
| 000000 | 0 |
| 000000 | 1 |
| 000001 | 2 |
| 000010 | 3 |
| 000100 | 4 |
| 001000 | 5 |
| 010000 | 6 |
| 100000 | 7 |

TABLE A-continued order: 6
feedback coefficients: 100111
first state: 000001

| STAGES | C |
|---|---|
| 100111 | 8 |
| 101001 | 9 |
| 110101 | 10 |
| 001101 | 11 |
| 011010 | 12 |
| 110100 | 13 |
| 001111 | 14 |
| 011110 | 15 |
| 111100 | 16 |
| 011111 | 17 |
| 111110 | 18 |
| 011011 | 19 |
| 110110 | 20 |
| 001011 | 21 |
| 010110 | 22 |
| 101100 | 23 |
| 111111 | 24 |
| 011001 | 25 |
| 110010 | 26 |
| 000011 | 27 |
| 000110 | 28 |
| 001100 | 29 |
| 011000 | 30 |
| 110000 | 31 |
| 000111 | 32 |
| 001110 | 33 |
| 011100 | 34 |
| 111000 | 35 |
| 010111 | 36 |
| 101110 | 37 |
| 111011 | 37 |
| 010001 | 39 |
| 100010 | 40 |
| 100011 | 41 |
| 100001 | 42 |
| 100101 | 43 |
| 101101 | 44 |
| 111101 | 45 |
| 011101 | 46 |
| 111010 | 47 |
| 010011 | 48 |
| 100110 | 49 |
| 101011 | 50 |
| 110001 | 51 |
| 000101 | 52 |
| 001010 | 53 |
| 010100 | 54 |
| 101000 | 55 |
| 110111 | 56 |
| 001001 | 57 |
| 010010 | 58 |
| 100100 | 59 |
| 101111 | 60 |
| 111001 | 61 |
| 010101 | 62 |
| 101010 | 63 |
| 110011 | 64 → 2 |

In TABLE A, one polynomial transform, having 27 rows and 6 columns is selected starting with count 52, extending through count 64, wrapping around to count 2, and extending through count 15. Such a transform is used as one example of a transform hereinafter in TABLE 3. Of course, the feedback coefficient, the number of stages in the shift register, and the number of rows and columns selected to form the transform can all be varied.

Computer System—FIG. 1

A computer system including a processor unit ("PU") 26 and a memory system 2 is shown in FIG. 1. The processor unit 26 is typically a processor for doing high-speed numeric computations. Computations by processor unit 26 require the fetching and storing of operands from and to the memory system 2 and a memory unit 30 "MV" within memory system 2.

The memory latency for the computer system shown in FIG. 1 is the amount of time that it takes for the memory system 2 to return information to the processor unit 26 after a request for information by the processor unit 26. The processor unit 26 executes instructions. The processor unit 26 may be a single processor unit or may be a number of different processing units, I/O units or other parts of a computer system which make accesses to the memory system 2 for fetching and storing information. A processor output bus 22 carries information from the processor unit 26 to an input unit ("IU") 27. This information typically includes operands, addresses of the operands, and associated control signals. Input unit 27 connects by a bus 19 and a line 62 to the memory unit 30. When operands are to be stored into the memory unit 30 by the processor unit 26, the address and control signals are connected from bus 22 through the input unit 27 over bus 19 to the memory unit. When operands are fetched from the memory unit 30, the address and control signals are connected over buses 22 and 19 to the memory unit 30. When operands are fetched by processor unit 26 from the memory unit 30, the memory unit provides the fetched operands and control signals on a bus 15 through an output unit ("OU") 28 onto an input bus 24 which connects to the processor unit 26. A control unit ("CTCL") 29 provides control signals associated with the processes of fetching and storing operands from and to the memory unit 30. The control unit 29 communicates with the output unit 28 as indicated by lines 81 and 81A.

In a typical embodiment, the memory unit 30 includes a plurality of memory modules 31 which are organized into one or more banks of memory modules. Also in a typical system, the input unit 27 includes a map unit 32 for modifying the addresses on bus 22 from the processing unit 26 to provide for more efficient storage of information within the memory modules of the memory units 30.

The map unit 32 tends to distribute memory accesses uniformly among the various memory modules 31. If, during program execution by the processing unit 26, accesses tend to be concentrated at a particular one or more of the memory modules 31 to the exclusion of others of the memory modules 31, then the actual latency time of the memory unit 30 will be increased while waiting for the heavily used memory module to complete its operations. When the memory accesses tend to be distributed uniformly among the memory modules 31, the memory modules 31 tend to operate in parallel, thereby avoiding delays which could be introduced into the system.

Preferably, memory accesses from the processor unit 26 are statically scheduled so that both the order in which items of information are to be returned and the time at which such items are to be returned are known in advance and expected by the processor unit 26. In general, the order that information is requested by the processing unit 26 is the order in which information is returned to the processing unit 26 and the time of return is the time expected by the processing unit 26. If, for some reason, the processing unit 26 does not receive the information requested from the memory system 2 at the expected time, then the processing unit 26 suspends further processing until the requested information is returned. In actuality, the processing clock of the processing unit 26 is suspended whenever the memory system 2 indicates that the requested information at the requested time is not available for return to the processing unit 26.

The bus 22 to the input unit 27 includes at least an address portion and a data portion. A single bus can be employed in which the address portion appears on the bus at one time and the data portion appears on the bus at another time. In the example described, however, data and address appear at different physical locations at the same time.

An output control field is carried by a line 60 from the unit 27 to the control unit 29.

Figure 2:
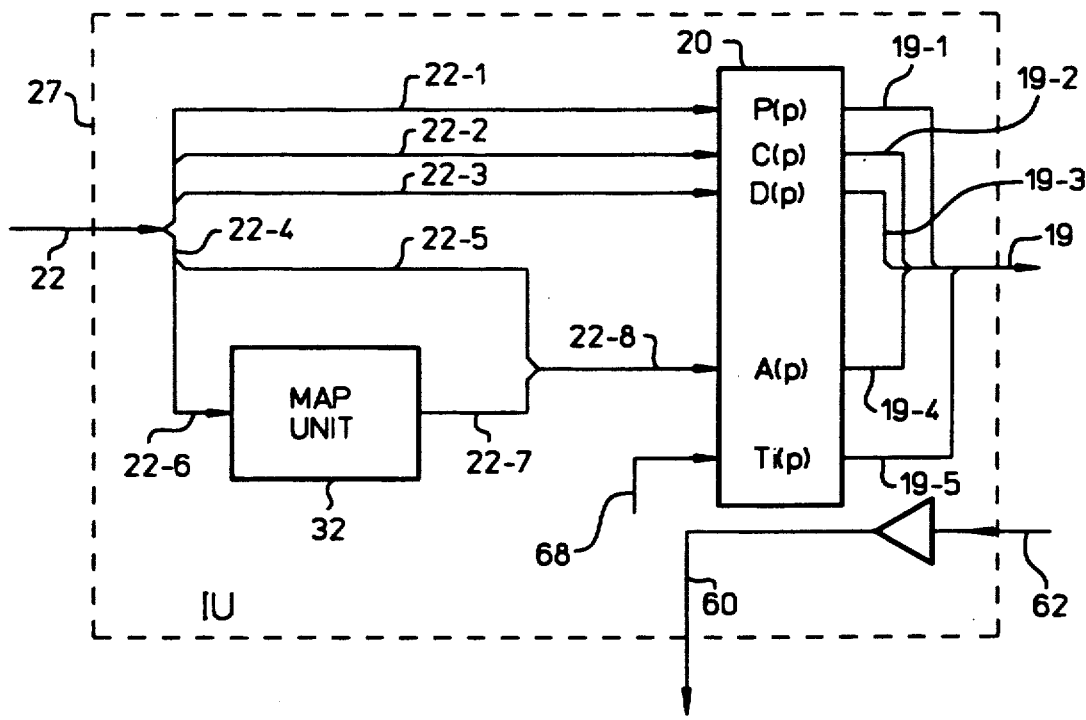
FIG. 2 depicts one embodiment of the input unit (IU) of the FIG. 1 system.

Input Unit-FIG. 2

In FIG. 2, further details of the input unit (IU) 27 of FIG. 1 are shown for one simple embodiment. The input unit 27 receives the input bus 22 and provides the output bus 19 through a unit 20. The input bus 22 includes a P port bus 22-1 including the bits P(1,0), a C control bus 22-2 including the bits C(1,0), a D data bus 22-3 including the bits D(31, . . . , 0), and an A address, bus 22-4 including the address bits A(31, . . . , 0).

An input tag Ti(p) is carried from the control unit 29 to the input unit 27 by a line 68.

The address bus 22-4 includes the address fields as shown in the following TABLE 1.

TABLE 1

| | Ai(28, . . . ,2) | | |
|---|---|---|---|
| Ai(31, . . . ,29) | Ai(28, . . . ,8) | Ai(7, . . . ,2) | Ai(1,0) |

In the embodiment shown, the two low-order address bits (Ai(1,0) are byte addresses within a four-byte word; these two bits are not utilized by the map unit 32. The input address field Ai(28, . . . , 2) designates an address within the utilized memory space; this address field is partitioned into the addresses Ai(28, . . . , 8) and Ai(7, . . . , 2), both of which are utilized by the map unit 32. The three high-order address bits Ai(31, 30, 29) are not utilized by the map unit 32. It will be apparent that various ones of the address bits could be utilized in alternate embodiments.

The bus 22-4, which carries the input address bits Ai(31, . . . , 0), divides into a bypass bus 22-5 and a map unit input bus 22-6. The bypass bus 22-5 carries the address bits Ai(31, 30, 29), the bits Ai(28, . . . , 8) and the bits Ai(1,0) from the bus 22-4 to an output bus 22-8, bypassing the map unit 32. When on the output bus 22-8, the bits Ai(31, 30, 29), Ai(28, . . . , 8), and Ai(1,0) are re-designated as output bits Ao(31, 30, 29), Ao(28, . . . , 2), and Ao(1,0), respectively, but are unchanged in value.

The map unit input bus 22-6 carries the bits Ai(28, . . . , 8) and the bits Ai(7, . . . , 2) to the map unit 32; the map unit 32 uses these bits to provide output address bits Ao(7, . . . , 2) which in general are different from the input bits Ai(7, . . . , 2). A map unit output bus 22-7 carries the output bits Ao(7, . . . , 2) to the bus 22-8. The output address bits carried by the bus 22-8 are indicated in the following TABLE 2.

TABLE 2

| Ao(31, . . . ,29) | Ao(28, . . . ,8) | Ao(7, . . . ,2) | Ao(1,0) |
|---|---|---|---|

In TABLE 2, the high order fields are the same for the output and the input as indicated by the following Eqs.(1).

$$Ao(31, \ldots, 29) = Ai(31, \ldots, 29)$$
$$Ao(28, \ldots, 8) = Ai(28, \ldots, 8) \quad \text{Eqs. (1)}$$

The output field Ao(7, . . . , 2), or more generally Ao(j) where j is 7, . . . , 2, is different from the corresponding input field. In particular, the output field is obtained by transforming the input field Ai(28, . . . , 2), or more generally Ai(k) where k is 28, . . . , 2, with a mapping transform, H, as indicated by the following Eqs.(2).

$$Ao(j) = [Ai(k)][H]$$
$$Ao(7, \ldots, 2) = [Ai(28, \ldots, 2)][H] \quad \text{Eqs. (2)}$$

The byte output field Ao(1,0) is the same as the corresponding input field as indicated by the following Eq.(3).

$$Ao(1,0) = Ai(1,0) \quad \text{Eq.(3)}$$

The address output field Ao(7, . . . , 2) is used to designate a particular one of a plurality of memory modules to be selected for storing or retrieving information. In the present example, a 6-bit field is employed designating 64 different memory modules. Of course, 6 bits is merely one typical example and any number of memory modules can be employed.

The output bits Ao(7, . . . , 2) which designate the memory module are different from the corresponding input bits Ai(7, . . . , 2) because of the map unit transform. Many computer programs generate sequences of addresses that are characterized by regular patterns. Such patterns can cause these sequential addresses to be clustered in one memory module or in a group of memory modules such that certain ones of the memory modules are accessed relatively more often while other ones of the modules are accessed relatively less often. The more frequently accessed modules are likely to receive conflicting access requests and to respond to some of these with busy signals, thereby slowing down the computer. The memory system 2 tends to distribute memory accesses randomly to all the modules, regardless of any pattern in a sequence of addresses, thereby tending to minimize any conflicting demands on any one memory module and thus minimizing the occurrence of busy signals and resulting system delays.

The distribution of accesses more evenly over all of the memory modules is achieved by mapping the input addresses Ai(28, . . . , 2) to form the memory module output Ao(7, . . . , 2) as indicated in Eq.(2).

The logical innerproduct ("IP") of the two bit-vectors (vectors where the elements are 0 and 1). A(j) and B(j) where j has values 0, 1, . . . , (J−1) is as follows:

$$IP = \sum_j [A(j)] * [B(j)] \quad \text{Eq. (4)}$$

where,
* = logical AND
Σ = logical EXCLUSIVE-OR.

The transform H of Eq.(2) is explained using an innerproduct as defined in Eq.(4) where k is the index for each bit of the output Ao(7, . . . , 2). That is, Ao(k)=Ao(7, . . . , 2) for k having each of the values 7, . . . , 2.

For each value 7, ..., 2 of k the logical innerproduct is as follows:

$$Ao(k) = \sum_j [Ai(j)] * [H(j,k)] \quad \text{Eq. (5)}$$

where
- k = address bit index for mapped output bits
- j = address bit index for input address bits
- * = logical AND
- Σ = logical EXCLUSIVE-OR .

Eq (5) indicates that each address bit Ao(k) is formed as the logical AND of an input row Ai(j) and a mapping transform column H(j,k).

For each of the values 7, ..., 2 of k in Eq.(5), a corresponding one of the following Eqs.(6) indicates that each address bit Ao(k) is formed as the logical AND of an input row Ai(j) and a mapping transform column H(j,k) where j has the values corresponding to each of the input address bits.

$$\begin{aligned}Ao(7) &= \sum_j [Ai(j)] * [H(j,7)]\\ Ao(6) &= \sum_j [Ai(j)] * [H(j,6)]\\ &\vdots\\ Ao(2) &= \sum_j [Ai(j)] * [H(j,2)]\end{aligned} \quad \text{Eqs. (6)}$$

Eqs.(6) for the example where j equals 28, ..., 2 are expressed as the following Eqs.(7).

$$Ao(7) = [Ai(28, \ldots, 2)]\theta \begin{bmatrix} H(28,7) \\ \vdots \\ H(2,7) \end{bmatrix}$$

$$Ao(6) = [Ai(28, \ldots, 2)]\theta \begin{bmatrix} H(28,6) \\ \vdots \\ H(2,6) \end{bmatrix}$$

$$\vdots$$

$$Ao(2) = [Ai(28, \ldots, 2)]\theta \begin{bmatrix} H(28,2) \\ \vdots \\ H(2,2) \end{bmatrix}$$

Eqs. (7)

In Eqs.(7), the operator θ indicates the logical innerproduct of each of the row and column bit vectors. The Eqs.(7) can be rewritten in the following form as Eq.(8).

$$Ao(7, \ldots, 2) = [Ai(28, \ldots, 2)]\theta \begin{bmatrix} H(28,7) & \cdots & H(28,2) \\ \vdots & & \vdots \\ H(2,7) & \cdots & H(2,2) \end{bmatrix} \quad \text{Eq. (8)}$$

In Eq.(8), the H transform matrix has the j input address bit index having values 28, ..., 2 and the k mapped output index having values 7, ..., 2 for the one particular example described.

Map Unit

The map unit 32 of FIG. 2 can be a conventional logic device which performs all of the logical AND and logical EXCLUSIVE-OR functions as described in connection with Eq.(1) through Eq.(8). As a logical unit, the map unit 32 of FIG. 2 receives in the address bits Ai(28, ..., 2) and performs the logical operations of Eq.(2) and Eq.(4)-through Eq.(8) using map table values for the matrix H as set forth, for example, in the following TABLE 3.

TABLE 3

| j | H(j,k) | k |
|---|---|---|
|   |   | 765432 |
| 0 |   | 000000 |
| 1 |   | 000000 |
| 2 | ⌈H(2,7) ... H(2,2)⌉ | 000101 |
| 3 |   | 001010 |
| 4 |   | 010100 |
| 5 |   | 101000 |
| 6 |   | 110111 |
| 7 |   | 001001 |
| 8 |   | 010010 |
| 9 |   | 100100 |
| 10 |   | 101111 |
| 11 |   | 111001 |
| 12 |   | 010101 |
| 13 |   | 101010 |
| 14 | . . | 110011 |
| 15 | . . | 000001 |
| 16 |   | 000010 |
| 17 | . . | 000100 |
| 18 |   | 001000 |
| 19 |   | 010000 |
| 20 |   | 100000 |
| 21 |   | 100111 |
| 22 |   | 101001 |
| 23 |   | 110101 |
| 24 |   | 001101 |
| 25 |   | 011010 |
| 26 |   | 110100 |
| 27 |   | 001111 |
| 28 | ⌊H(28,7) ... H(28,2)⌋ | 011110 |

In TABLE 3, the all 0's (indicated as 00000) for H(0,7), ..., (0,2) and H(1,7), ..., H(1,2) corresponding to j equal to 0 and 1 are not used in the H(j,k) map table. For j equal to 2, the values of H(2,k) for k equals to 7, ..., 2 are 000101 and are given in TABLE 3 as follows:
H(2,7)=0
H(2,6)=0
H(2,5)=0
H(2,4)=1
H(2,3)=0
H(2,2)=1

In a similar manner, for j equal to 3, the following values 001010 of H(3,k) are given in TABLE 3:
H(3,7)=0

H(3,6)=0
H(3,5)=1
H(3,4)=0
H(3,3)=1
H(3,2)=0

In a similar manner, for j equal to 4, ..., 28, the values of H(j,k) are given in TABLE 3. While 27 values of j were selected for the map table, any number of values can be employed. For higher values of j, selections can be made from the following TABLE 4 if more than 27 input address bits are to be mapped to form the output mapped address bits.

TABLE 4

| j | H(j,k) k 765432 |
|---|---|
| 29 | 111100 |
| 30 | 011111 |
| 31 | 111110 |
| 32 | 011011 |
| 33 | 110110 |
| 34 | 001011 |
| 35 | 010110 |
| 36 | 101100 |
| 37 | 111111 |
| 38 | 011001 |
| 39 | 110010 |
| 40 | 000011 |
| 41 | 000110 |
| 42 | 001100 |
| 43 | 011000 |
| 44 | 110000 |
| 45 | 000111 |
| 46 | 001110 |
| 47 | 011100 |
| 48 | 111000 |
| 49 | 010111 |
| 50 | 101110 |
| 51 | 111011 |
| 52 | 010001 |
| 53 | 100010 |
| 54 | 100011 |
| 55 | 100001 |
| 56 | 100101 |
| 57 | 101101 |
| 58 | 111101 |
| 59 | 011101 |
| 60 | 111010 |
| 61 | 010011 |
| 62 | 100110 |
| 63 | 101011 |
| 64 | 110001 |

When the map table of TABLE 3 is employed, the memory modules selected, as defined by the mapped output bits Ao(7, ..., 2) in response to sequences of input address bits Ai(28, ..., 2), tend to have a random distribution. That random distribution can be observed in the following TABLE 5. In TABLE 5, the input address Ai, for the address bits Ai(28, ..., 2), is represented in decimal notation. The column "Ai" in TABLE 5 represents the sequence Ai(S) of input addresses formed by the input addresses 0, 4, 12, ..., 508. Each next input address in the sequence is formed by incrementing the previous input address by 4 bytes. Such a sequence is said to have a stride of 4 bytes, that is, a one word stride when a word consists of 4 bytes. The memory module selected for each input address Ai, when the map unit 32 of FIG. 2 is employed, is designated by the column MMh. The memory module which would be selected without use of the map unit is represented in the column MMu. Note that the distribution of the addresses in the case of MMh tends to be random and evenly distributed over all modules while the distribution in the case of the unmapped addresses, MMu, is in order. Nonetheless, the distribution in both cases tends to be uniform over all 64 of the memory modules employed.

TABLE 5

(Stride = 4 bytes)

| Ai | MMh | MMu | Ai | MMh | MMu | Ai | MMh | MMu |
|---|---|---|---|---|---|---|---|---|
| 0 | 0 | 0 | 176 | 53 | 44 | 344 | 59 | 22 |
| 4 | 5 | 1 | 180 | 48 | 45 | 348 | 62 | 23 |
| 8 | 10 | 2 | 184 | 63 | 46 | 352 | 13 | 24 |
| 12 | 15 | 3 | 188 | 58 | 47 | 56 | 8 | 25 |
| 16 | 20 | 4 | 192 | 62 | 48 | 360 | 7 | 26 |
| 20 | 17 | 5 | 196 | 59 | 49 | 364 | 2 | 27 |
| 24 | 30 | 6 | 200 | 52 | 50 | 368 | 25 | 28 |
| 28 | 27 | 7 | 204 | 49 | 51 | 372 | 28 | 29 |
| 32 | 40 | 8 | 208 | 42 | 52 | 376 | 19 | 30 |
| 36 | 45 | 9 | 212 | 47 | 53 | 380 | 22 | 31 |
| 40 | 34 | 10 | 216 | 32 | 54 | 384 | 27 | 32 |
| 44 | 39 | 11 | 220 | 37 | 55 | 388 | 30 | 33 |
| 48 | 60 | 12 | 224 | 22 | 56 | 392 | 17 | 34 |
| 52 | 57 | 13 | 228 | 19 | 57 | 396 | 20 | 35 |
| 56 | 54 | 14 | 232 | 28 | 58 | 400 | 15 | 36 |
| 60 | 51 | 15 | 236 | 25 | 59 | 404 | 10 | 37 |
| 64 | 55 | 16 | 240 | 2 | 60 | 408 | 5 | 38 |
| 68 | 50 | 17 | 244 | 7 | 61 | 412 | 0 | 39 |
| 72 | 61 | 18 | 248 | 8 | 62 | 416 | 51 | 40 |
| 76 | 56 | 19 | 252 | 13 | 63 | 420 | 54 | 41 |
| 80 | 35 | 20 | 256 | 18 | 0 | 424 | 57 | 42 |
| 84 | 38 | 21 | 260 | 23 | 1 | 428 | 60 | 43 |
| 88 | 41 | 22 | 264 | 24 | 2 | 432 | 39 | 44 |
| 92 | 44 | 23 | 68 | 29 | 3 | 436 | 34 | 45 |
| 96 | 31 | 24 | 272 | 6 | 4 | 440 | 45 | 46 |
| 100 | 26 | 25 | 276 | 3 | 5 | 444 | 40 | 47 |
| 104 | 21 | 26 | 280 | 12 | 6 | 448 | 44 | 48 |
| 108 | 16 | 27 | 284 | 9 | 7 | 452 | 41 | 49 |
| 112 | 11 | 28 | 288 | 58 | 8 | 456 | 38 | 50 |
| 116 | 14 | 29 | 292 | 63 | 9 | 460 | 35 | 51 |
| 120 | 1 | 30 | 296 | 48 | 10 | 464 | 56 | 52 |
| 124 | 4 | 31 | 300 | 53 | 11 | 468 | 61 | 53 |
| 128 | 9 | 32 | 304 | 46 | 12 | 472 | 50 | 54 |
| 132 | 12 | 33 | 308 | 43 | 13 | 476 | 55 | 55 |
| 136 | 3 | 34 | 312 | 36 | 14 | 480 | 4 | 56 |
| 140 | 6 | 35 | 316 | 33 | 15 | 484 | 1 | 57 |
| 144 | 29 | 36 | 320 | 37 | 16 | 488 | 14 | 58 |
| 148 | 24 | 37 | 324 | 32 | 17 | 492 | 11 | 59 |
| 152 | 23 | 38 | 328 | 47 | 18 | 496 | 16 | 60 |
| 156 | 18 | 39 | 332 | 42 | 19 | 500 | 21 | 61 |
| 160 | 33 | 40 | 336 | 49 | 20 | 504 | 26 | 62 |
| 164 | 36 | 41 | 340 | 52 | 21 | 508 | 31 | 63 |
| 168 | 43 | 42 | | | | | | |
| 172 | 46 | 43 | | | | | | |

In TABLE 6, an example of an address sequence Ai(S) is shown where each input addresses is incremented by 256 bytes each time, that is a stride of 256 bytes. In the case of TABLE 6, the memory module selected with the mapping operation, MMh, still tends to be random and uniformly distributed among the 64 memory modules. However, when the mapping unit is not employed, the distribution of the stride 256 addresses is all to the same MMu equal to 0, that is to MM(0) which is a single one of the 64 memory modules. In this case with the values of MMu equal to 0, all of the other 63 memory modules are not utilized and all accesses are to a single memory module. With a program that requires a large number of independent memory accesses, a large delay will result from attempts to access only a single memory module.

A comparison of the TABLE 6 memory module selection and the TABLE 5 memory module selection indicates that, for the mapping unit example of MMh, the desired uniform distribution across all of the memory modules occurs irrespective of the striding of the input addresses. Accordingly, the mapping unit avoids the adverse effects of input address striding. Input address striding frequently occurs in processing programs with matrix or vector processing. Such programs are uniformly well executed irrespective of striding when the mapping is employed.

Matrix multiplication according to Eq.(8) for the input address 0 results in an all 0's output and hence need not be described. With an input address of decimal

TABLE 6

| (Stride = 256 bytes) | | | | | | | | |
|---|---|---|---|---|---|---|---|---|
| Ai | MMh | MMu | Ai | MMh | MMu | Ai | MMh | MMu |
| 0 | 0 | 0 | 11008 | 37 | 0 | 22016 | 45 | 0 |
| 256 | 18 | 0 | 11264 | 60 | 0 | 22272 | 63 | 0 |
| 512 | 36 | 0 | 11520 | 46 | 0 | 22528 | 31 | 0 |
| 768 | 54 | 0 | 11776 | 24 | 0 | 22784 | 13 | 0 |
| 1024 | 47 | 0 | 12032 | 10 | 0 | 23040 | 59 | 0 |
| 1280 | 61 | 0 | 12288 | 63 | 0 | 23296 | 41 | 0 |
| 1536 | 11 | 0 | 12544 | 45 | 0 | 23552 | 48 | 0 |
| 1792 | 25 | 0 | 12800 | 27 | 0 | 23808 | 34 | 0 |
| 2048 | 57 | 0 | 13056 | 9 | 0 | 24064 | 20 | 0 |
| 2304 | 43 | 0 | 13312 | 16 | 0 | 24320 | 6 | 0 |
| 2560 | 29 | 0 | 13568 | 2 | 0 | 24576 | 25 | 0 |
| 2816 | 15 | 0 | 13824 | 52 | 0 | 24832 | 11 | 0 |
| 3072 | 22 | 0 | 14080 | 38 | 0 | 25088 | 61 | 0 |
| 3328 | 4 | 0 | 14336 | 6 | 0 | 25344 | 47 | 0 |
| 3584 | 50 | 0 | 14592 | 20 | 0 | 25600 | 54 | 0 |
| 3840 | 32 | 0 | 14848 | 34 | 0 | 25856 | 36 | 0 |
| 4096 | 21 | 0 | 15104 | 48 | 0 | 26112 | 18 | 0 |
| 4352 | 7 | 0 | 15360 | 41 | 0 | 26368 | 0 | 0 |
| 4608 | 49 | 0 | 15616 | 59 | 0 | 26624 | 32 | 0 |
| 4864 | 35 | 0 | 15872 | 13 | 0 | 26880 | 50 | 0 |
| 5120 | 58 | 0 | 16128 | 31 | 0 | 27136 | 4 | 0 |
| 5376 | 40 | 0 | 16384 | 51 | 0 | 27392 | 22 | 0 |
| 5632 | 30 | 0 | 16640 | 33 | 0 | 27648 | 15 | 0 |
| 5888 | 12 | 0 | 16896 | 23 | 0 | 27904 | 29 | 0 |
| 6144 | 44 | 0 | 17152 | 5 | 0 | 28160 | 43 | 0 |
| 6400 | 62 | 0 | 17408 | 28 | 0 | 28416 | 57 | 0 |
| 6656 | 8 | 0 | 17664 | 14 | 0 | 28672 | 12 | 0 |
| 6912 | 26 | 0 | 17920 | 56 | 0 | 28928 | 30 | 0 |
| 7168 | 3 | 0 | 18176 | 42 | 0 | 29184 | 40 | 0 |
| 7424 | 17 | 0 | 18432 | 10 | 0 | 29440 | 58 | 0 |
| 7680 | 39 | 0 | 18688 | 24 | 0 | 29696 | 35 | 0 |
| 7936 | 53 | 0 | 18944 | 46 | 0 | 29952 | 49 | 0 |
| 8192 | 42 | 0 | 19200 | 60 | 0 | 30208 | 7 | 0 |
| 8448 | 56 | 0 | 19456 | 37 | 0 | 30464 | 21 | 0 |
| 8704 | 14 | 0 | 19712 | 55 | 0 | 30720 | 53 | 0 |
| 8960 | 28 | 0 | 19968 | 1 | 0 | 30976 | 39 | 0 |
| 9216 | 5 | 0 | 20224 | 19 | 0 | 31232 | 17 | 0 |
| 9472 | 23 | 0 | 20480 | 38 | 0 | 31488 | 3 | 0 |
| 9728 | 33 | 0 | 20736 | 52 | 0 | 31744 | 26 | 0 |
| 9984 | 51 | 0 | 20992 | 2 | 0 | 32000 | 8 | 0 |
| 10240 | 19 | 0 | 21248 | 16 | 0 | 32256 | 62 | 0 |
| 10496 | 1 | 0 | 21504 | 9 | 0 | 32512 | 44 | 0 |
| 10752 | 55 | 0 | 21760 | 27 | 0 | | | |

In the following TABLE 7, the manner in which the logical operations of Eq.(8) are performed is explained in connection with several input address examples from TABLE 5. Note that for convenience in the following examples the order of address bits is reversed from Ai(8, ..., 2) to Ai(2, ..., 8). The input addresses, in decimal notation, are 0, 4, 8, 12 and 112. Those input addresses are shown in TABLE 7 with both decimal and binary values. The binary values of Ai(2, ... 28) are partitioned into three fields, Ai(0,1), Ai(2, ..., 6) and Ai(7, ..., 28). Only the values in the field Ai(2, ..., 6) are non-zero in the particular examples chosen and therefore the values in the fields Ai(0,1) and Ai(7, ..., 28) can be ignored.

TABLE 7

| $Ai_D$ | Ai(0,1) | Ai2,...,6) | Ai(7,...,28) |
|---|---|---|---|
| 0 | 00 | 00000 | 0,...,0 |
| 4 | 00 | 10000 | 0,...,0 |
| 8 | 00 | 01000 | 0,...,0 |
| 12 | 00 | 11000 | 0,...,0 |
| • | | | |
| • | | | |
| • | | | |
| 112 | 00 | 00111 | 0,...,0 |

4, multiplication according to Eq.(8) of the address bits Ai(2, ..., 28) [the reverse address bits Ai(28, ..., 2) are shown in Eq.(8) but the multiplication is the same except in reverse order] results in the matrix of Eq.(9).

$$[Ai(4_D)][H] = \begin{bmatrix} 000101 \\ 000000 \\ 000000 \\ \cdot \\ \cdot \\ \cdot \\ 000000 \end{bmatrix} \quad \text{Eq. (9)}$$

When each of the columns in the right hand side of Eq.(9) has all of its values EXCLUSIVE-OR'ed on a per column basis, the result is shown in Eq.(10).

$$[Ai(4_D)]\theta[H] = [000101] = 5_D \quad \text{Eq.(10)}$$

In Eq.(10), the resulting matrix value represents the mapped output address bits Ao(7, ..., 2) and the binary value is 000101 representing a $5_D$ decimal value.

In a similar manner, the input decimal value $8_D$ after, multiplication with the map table results in the matrix shown in Eq.(11).

$$[Ai(8_D)][H] = \begin{bmatrix} 000000 \\ 001010 \\ 000000 \\ . \\ . \\ . \\ 000000 \end{bmatrix} \quad \text{Eq. (11)}$$

The EXCLUSIVE-OR operations on the columns of Eq.(11) produce 001010 which indicates that the output module MMh is $10_D$ as shown in Eq.(12).

$$[A_D]\theta[H] = [001010] = 10_D \quad \text{Eq.(12)}$$

In Eq.(13), the matrix multiplication for a decimal $112_D$ address input is shown.

$$[Ai(112_D)][H] = \begin{bmatrix} 000000 \\ 000000 \\ 010100 \\ 101000 \\ 110111 \\ . \\ . \\ 000000 \end{bmatrix} \quad \text{Eq. (13)}$$

The EXCLUSIVE-OR operation on the columns in the matrix of

Eq.(13) results in the values of Eq.(14) which indicates as in TABLE 5 that the memory module MMh is $11_D$.

$$[Ai(112_D)]\theta[H] = [001011] = 11_D \quad \text{Eq.(14)}$$

Logic Circuit And Table Look-Up Map Unit.

In one embodiment, the map unit 32 includes electrical circuits of well-known design for performing the logical operations of Eq. (8).

In another embodiment, the map unit 32 includes a lookup table. In this embodiment, the map unit physically comprises a ROM, a RAM or another type of memory. The memory is addressed by the input address bits Ai(2, ..., 2) and in response provides the output bits Ao(7, ..., 2), some of which are shown in TABLE 5. A lookup table memory for the example described has $2^{27}$ 6-bit entries.

Partitioned Map Unit

As another alternative implementation, the map unit 32 can be partitioned into two or more logical units. For a two-unit example, the map unit 32 is partitioned into two separate logical units, namely a first, f, unit and a second, s, unit. The first unit receives a portion of the input address bits, for example, Ai(28, ..., 16), and provides a first output Af(7, ..., 2) and second unit receives a second portion of the address bits, for example, Ai(15, ..., 2) and provides a second output As(7, ..., 2).

The two-unit example employs two map matrices of the Eq.(8) type. In this example, the address bit index j, as described in connection with Eq.(1) through Eq.(8), is partitioned into f having values 0, ..., F and s having values 0, ..., S where J=F+S. Accordingly, in the example described, f has values 28, ..., 16 and s has values 15, ..., 2. With this designation, each output bit Ao(k) can be formed in the following manner.

For each value 7, ..., 2 of k, $$Ao(k) = [Af(k)] XOR [As(k)] \quad \text{Eq.(15)}$$

Eq. (15) indicates that each output bit Ao(k) is formed as the logical EXCLUSIVE-OR, indicated as XOR, of a bit Af(k) and a bit As(k). Eq. (15) can be expressed as follows in Eq. (16).

$$Ao(7, \ldots, 2) = [Af(7, \ldots, 2)]\theta \begin{bmatrix} As(7) \\ . \\ . \\ As(2) \end{bmatrix} \quad \text{Eq. (16)}$$

In Eq. (16), the matrix product additionally includes an EXCLUSIVE-OR operation as indicated by the $\theta$ operator. In Eq. (15) and Eq. (16), the values of Af(k) and As(k) are determined as follows.

For each value 7, ..., 2 of k, $$Af(k) = \sum_f [Ai(f)] * [H(f,k)] \quad \text{Eq. (17)}$$

where f = 28, ... 16

$$As(k) = \sum_s [Ai(s)] * [H(s,k)] \quad \text{Eq. (18)}$$

where s = 15, ..., 2

Eq.(17) and Eq.(18) are expressed in matrix notation as given by the following Eq.(19) and Eq.(20), respectively.

$$Af(7, \ldots, 2) = [Ai(28, \ldots, 16)]\theta \begin{bmatrix} H(28,7) & \ldots & H(28,2) \\ . & & . \\ . & & . \\ H(16,7) & \ldots & H(16,2) \end{bmatrix} \quad \text{Eq. (19)}$$

$$As(7, \ldots, 2) = [Ai(15, \ldots, 2)]\theta \begin{bmatrix} H(15,7) & \ldots & H(15,2) \\ . & & . \\ . & & . \\ H(2,7) & \ldots & H(2,2) \end{bmatrix} \quad \text{Eq. (20)}$$

The map unit 32 for the example described in connection with Eq.(19) and Eq.(20) can be either two separate logical units or two equivalent lookup tables. If the loopup table approach is employed, the address bits Ai(28, ..., 16) address a first table in a first memory. The size of the first memory is $2^{13}$ entries of 6-bits each. The second table is addressed by the address bits Ai(15, ..., 2) and contains $2^{14}$ 6-bit entries.

Figure 3:
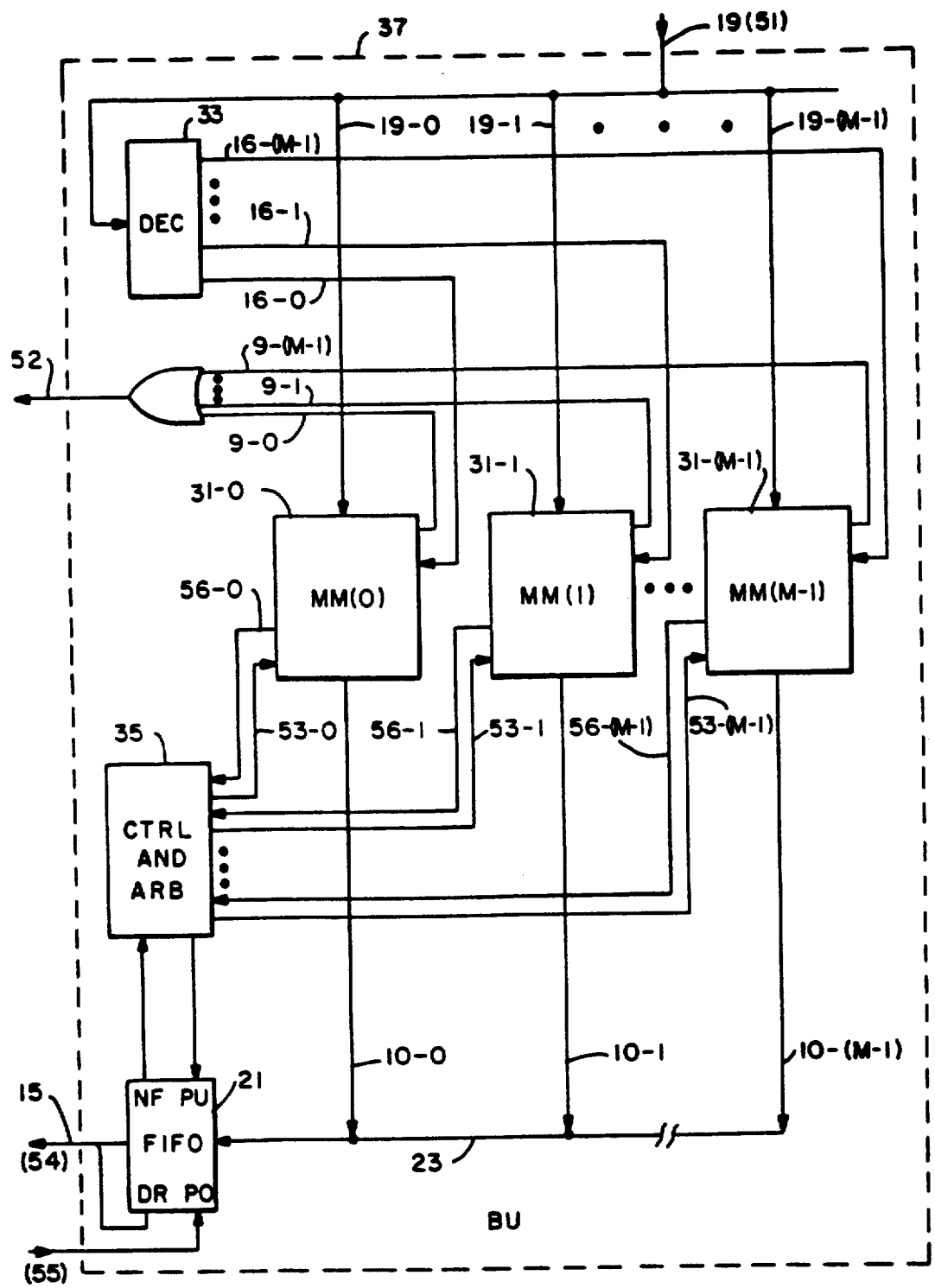
FIG. 3 depicts a bank unit formed of a plurality of memory modules and where one or more of the bank units forms the memory unit of FIG. 1.

Single Bank Memory Unit—FIG. 3

In FIG. 3, further details of a bank unit 37 are shown where the bank unit 37 forms all or part of the memory unit 30 in the FIG. 1 system. The bank unit 37 includes memory modules (MM) 31-0, 31—1, . . . , 31-(M−1). Accesses tend to be distributed uniformly to the memory modules by the map unit 32 of FIG. 2.

In FIG. 3, the bus 19 is connected in parallel as an input to each of the memory modules 31-0 through 31-(M−1). A portion of the transformed address, bits Ao(0, . . . , P1), is connected as an input to a decoder 33. Also, decoder 33 receives the control field C(p)[1,0] from the bus 19. The decoder 33 decodes the address bits Ao(0, . . . , P1) to select one of the output selection lines 16 including lines 16-0, . . . , 16-(M−1) to select one of the memory modules 31-0 through 31-(M−1) whenever the control field C(p)[1,0] indicates either a read (R) or a write (W) operation. The data, address and other fields on bus 19 are connected in parallel to the memory modules 31-0 through 31-(M−1). The particular one of the memory modules 31 enabled by an Output from the decoder 33 stores the data and receives the other information on bus 19 in the case of a write operation. In the case of a read operation, the information on bus 19 is received to read information from the selected module. The read operation or write operation is controlled by the C(p) control information from control bus 22-2 of FIG. 2 which is propagated in parallel on bus 19 to each of the memory modules 31.

For each operation, the selected memory module 3 receives the information on bus 19 and responds by performing the indicated operation. A plurality of output buses 10-0 through 10-(M−1) are connected in common through a bus 23 to an output first-in-first-out buffer (FIFO) 21. In order to determine which one of the memory modules 31 gains access to the output bus 23 when more than one memory module is ready to provide an output, a control unit 35 provides arbitration. The control unit 35 insures that only one of the memory modules at one time provides an output for the bus 23. Each of the modules 31-0 through 31-(M−1) receives a "priority granted" signal on an associated one of a plurality of lines 53-0 through 53-(M−1) from the control unit 35. Similarly, each of the modules 31-0 through 31-(M−1) provides a "data ready" signal to the control unit 35 on an associated one of a plurality of lines 56-0 through 56-(M−1). The priority circuitry can be conventional with a fixed priority. Alternatively, the priority can change in a rotating manner.

The selected output from the memory modules 31 is stored into the FIFO buffer 21. The output buffer 21 provides the accessed data from bus 23 as an output on bus 15 which provides, through output unit 28 of FIG. 1, an input to the processor unit 26 of FIG. 1. A tag provided with the accessed data from a memory module 31 is connected into the control 29 of FIG. 1 which compares the output tag with the expected input tag to insure that the returned data from the memory modules 31 is the expected data at the expected time requested by the processor unit 26 of FIG. 1. If the tags do not compare, then the control 29 issues a signal on a line 65 to indicate that the requested data is not yet available from the memory modules.

Figure 4:
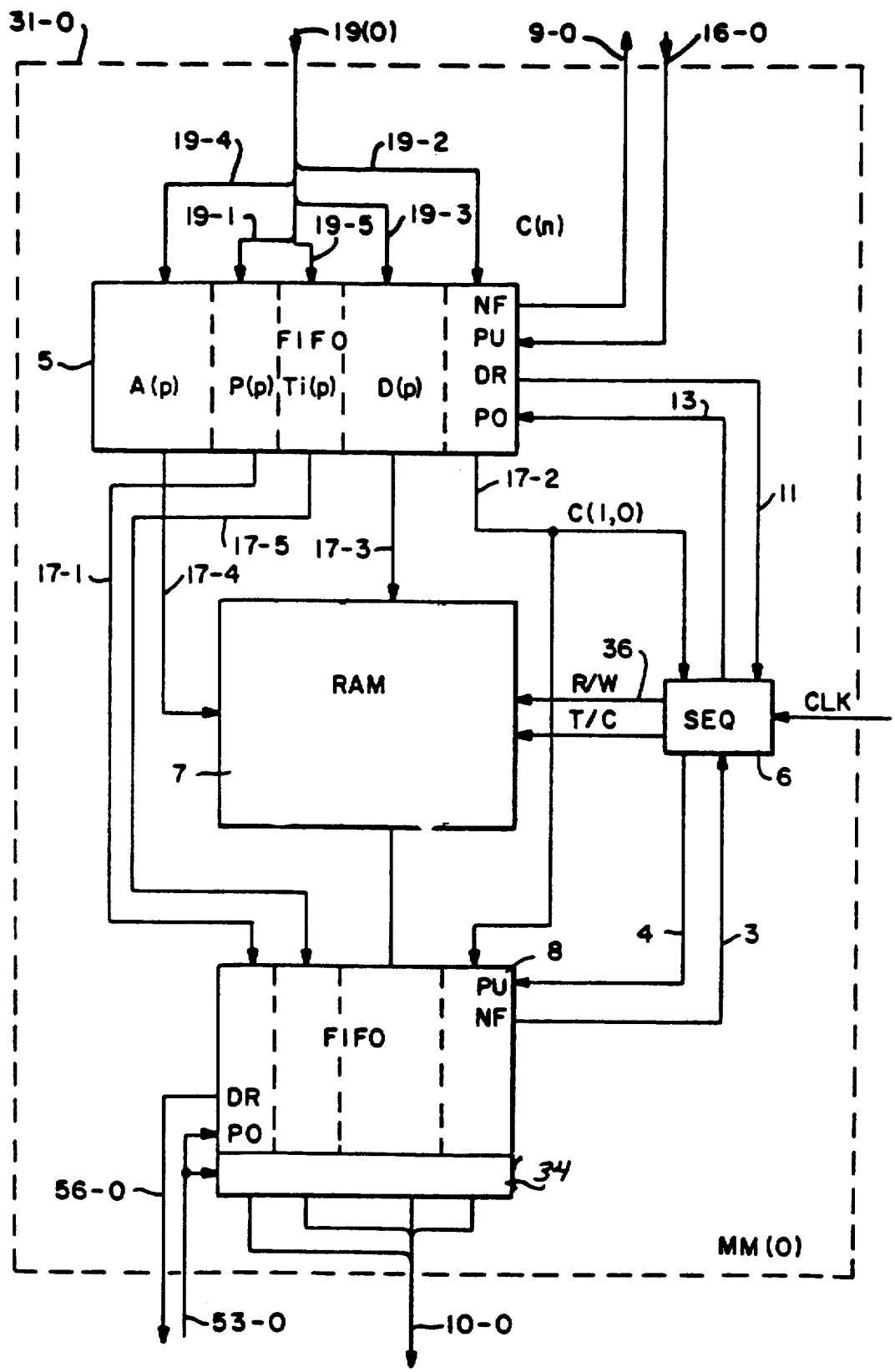
FIG. 4 depicts a typical one of the memory modules (MM) within the FIG. 3 bank unit.

Typical Memory Module-FIG. 4.

In FIG. 4, memory module 31-0 is shown as typical of all the memory modules 31 of FIG. 3. The memory module 31-0 has an input FIFO 5 and an output FIFO 8. The input FIFO 5 receives the input bus 19 including address bus 19-4 for storing bits Ao(28, . . . , 4), data bus 19-3 for storing bits D(31, . . . , 0), control bus 19-2 for storing bits C(1,0), tag bus 19-5 for storing bits Ti(6, . . . , 0), and port bus 19-1 for storing bits P(1,0). Data is pushed into the FIFO 5 when a decoded signal on line 16-0 causes a push (PU) into FIFO 5. A not full signal (NF) on a line 9-0 is provided to indicate a not full condition of the FIFO 5. Also a data ready signal (DR) line 11 is provided from FIFO 5 to indicate a non-empty condition. Data is popped from the FIFO 5 under control of a pop signal (PO) on a line 13 from a sequencer 6. The sequencer 6 is a conventional device for sequencing signals for writing into and reading from a random access memory (RAM) 7. Typically, the RAM 7 requires six clock cycles to complete a read six for a write operation. The RAM 7 receives a bus 17-3 from the field of the FIFO 5 corresponding to bus 19-3 and stores information into the corresponding field of RAM 7 during a write cycle under control of the sequencer 6. A read/write (R/W) line 36 to RAM 7 from sequencer 6 is controlled in response from the control field of the FIFO 5 on a line 17-2 indicating to the sequencer 6 whether a read cycle or a write cycle should be performed. Additional cycles are possible such as no operation (NOOP) or reads and writes of different data widths (byte, half word, for example). For the present example, however, only read, write and NOOP cycles are described. When the FIFO 5 indicates that data is available by a DR signal on line 11, sequencer 6 initiates the cycle designated by the control signals on lines 17-2, namely a read cycle, a write cycle or a NOOP cycle. The sequencer 6 initiates read or write operations by control signals on lines 36 in response to the control signals on lines 17-2 and causes a pop (PO) signal to the FIFO 5 after the read or write operation is complete. If the memory module output buffer 8 is full, which condition is indicated by the absence of a not full ("NF") signal on a line 3 extending from the buffer 8 to the sequencer 6, then the sequencer 6 will not complete a read request.

The RAM 7 receives an address on a bus 17-4 from the address field of the FIFO 5 and stores the data carried by the bus 17-3 at said address. Control and other information is carried by a bus 17-1, a bus 17-5 and the bus 17-2; this information bypasses the RAM 7 and is connected as the input to the FIFO 8. If a read cycle is called for by the control signal on line 17-2, then the data stored in RAM 7 at the address specified by bus 17-4 is accessed and output to FIFO 8 after 6 cycles and the sequencer 6 pushes, by a signal (PU) on a line 4, the accessed data from RAM 7 and the information carried by buses 17-1, 17-2, and 17-5 into the output FIFO 8. Sequencer 6 will cause a return (data to be accessed from RAM 7 for output) only if the not full signal (NF) on line 3 from the FIFO 8 to sequencer 6 is enabled. The FIFO 8 provides a data ready signal (DR) on the line 56-0 which connects to the control unit 35 as shown in of FIG. 3. The data ready signal on line 56-0 indicates that the memory module 31-0 of FIG. 4 has data which is to be output to the bus 23 and the data out FIFO 21 of FIG. 3. When the control 35 determines that it is the proper time for the memory module 31-0 to output data, then control 35 connects a signal on line 53-0 to the pop (PO) input of FIFO 8 and a gate 34. The PO signal is delayed until after the information has been gated out to bus 10-0.

Figure 5:
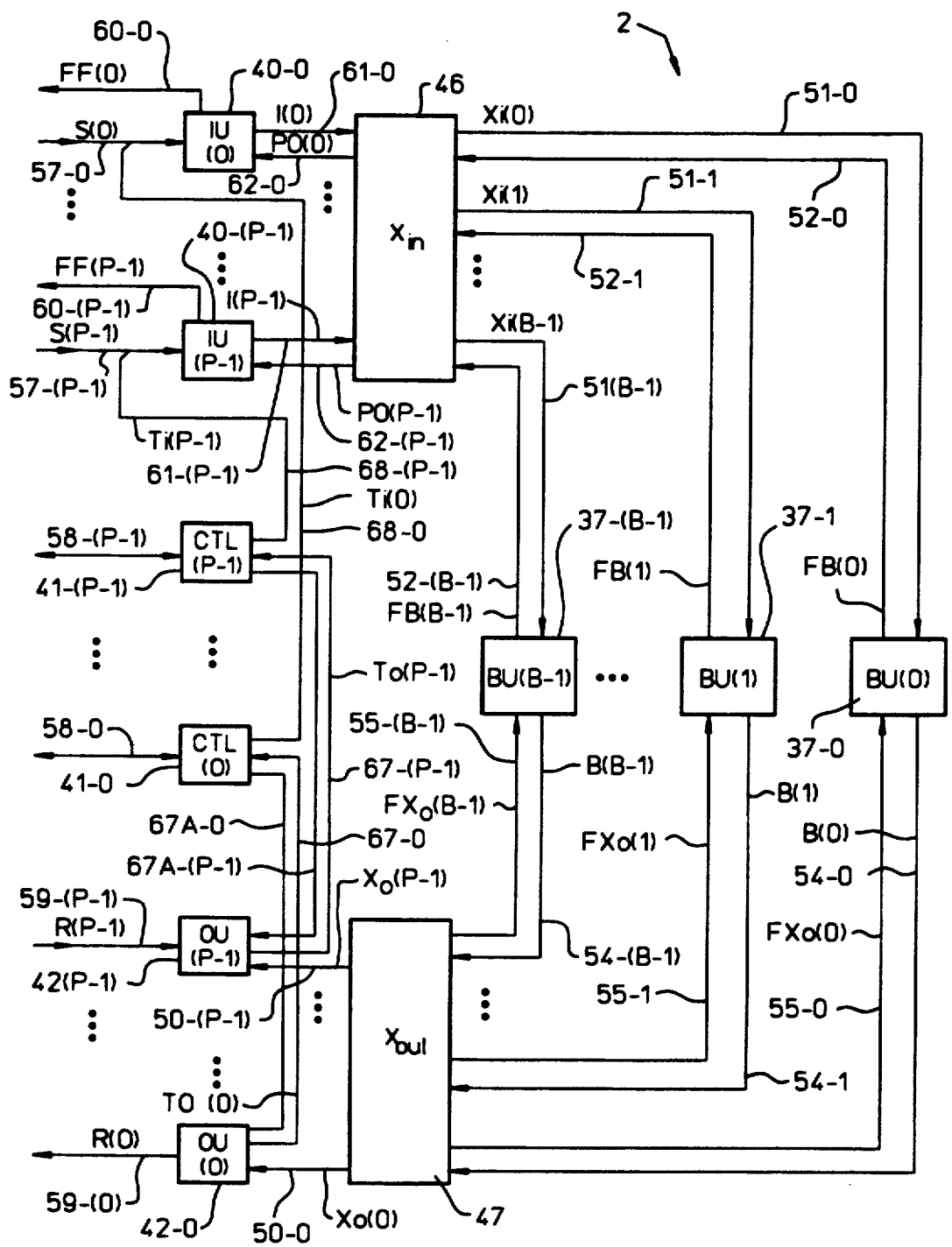
FIG. 5 depicts a plural port, plural bank unit embodiment of the memory system of FIG. 1.

A Multiport Multibank Embodiment-FIG. 5

In FIG. 5, a multiport, multibank embodiment incorporating the present invention is shown. The ports are designated by the letter p where p has the values 0,1, ... (P−1). Each port has a input bus S(p) so that for a P-port system the buses are S(0), S(1), ..., S(P−1). Each one of the buses S(p) is like the bus 22 in FIG. 1 and includes an address field A(p), a data field D(p), a control field C(p), and a port identification field P(p). Also, in connection with the operation, a tag field T(p) is associated with each port. While the field sizes for addresses, data, control, port and tags can be any desired value, the particular embodiment described has 32-bit address and data fields, 2-bit control and port fields and an 8-bit tag field. Accordingly, the address field is designated as A(p)[31, ..., 0]. The data field is designated as D(p)[31, ..., 0]. The control field is designated as C(p)[1,0]. The port field is designated as P(p)[1,0]. The tag field is designated at T(p)[7, ..., 0]. In the above designations, the value of "p" is correlated with the particular port and can have any one of the values 0,1, ... (P−1). In one particular embodiment, P equals 4.

In addition, the tag field T(p) actually has two values: an input tag Ti(p) associated with the input and an output tag To(p) associated with the output.

In FIG. 5, in addition to the input fields, each port has associated an output control field FF(p) carried by a line 60(p). This control field is returned to the processor to indicate control conditions, particularly, to indicate when the processor clock should be stopped because the memory system is temporarily busy and momentarily cannot accept further requests for memory accesses.

In the FIG. 5 system, each port in addition to the S(0), ..., S(P−1) supply buses 57-0 through 57-(P−1) includes the corresponding return buses R(p) which for the P ports includes the buses R(0), R(1), ... R(P−1) and these buses are designated as 59-0, 59-1, ..., 59-(P−1), respectively. The buses R(p) are 32-bit data buses and hence have the data bits R(p)[31, ... 0].

In FIG. 5, the R(p) buses 59-0, ..., 59-(P−1) connect from the output units OU(0), ..., OU(P−1) designated as 42-0, ..., 42(P−1), respectively, to processor unit 26 of FIG. 1 or to other processors (not shown) or I/O buses (not shown).

In FIG. 5, the input buses S(0), ..., S(P−1) from processor unit 26 of FIG. 1 together with the tag buses Ti(0), ..., Ti(P−1) all connect as inputs to the input units IU(0), ..., IU(P−1), respectively. The input units are designated by reference numerals 40-0 through 40-(P−1).

Similarly, the output lines FF(0), ..., FF(P−1) connect from the input units IU(0), ..., IU(P−1), respectively, to the control 29 of FIG. 1.

In FIG. 5, the P control units CTL(0), ..., CTL(P−1) designed by reference numerals 41-0 through 410(P−1) provide the input tags Ti(0), ..., Ti(P−1) to the input units IU(0), ..., IU(P−1) on lines 68-0, ..., 68-(P−1).

In FIG. 5, the control units CTL(0), ..., CTL(P−1) receive the output tags To(0), ..., To(P−1), respectively, from the output units OU(0), ..., OU(P−1), respectively on lines 67-0, ..., 67-(P−1). The control units also communicate with the output units 42-0 through 42-(P−1) as indicated by lines 67A-0 through 67A-(P−1) extending from the control units to the respective output units. The control units also communicate with other parts of the system such as the processor unit 26 as indicated by lines 58-0 through 58-(P−1) respectively.

In FIG. 5, each of the input units IU(0), ..., IU(P−1) connects the input signals I(0), ..., I(P−1) on the input lines 61-0, ..., 61-(p−1), respectively, to an input switch Xin 46 and receives back the signals PO(0), ..., pO(P−1) on the lines 62-0, ..., 62-(P−1), respectively. The signals PO(p) designate when the corresponding input data on the bus I(p) has been accepted into the switch 46. The switch 46 has B output buses Xi(0), Xi(1), ..., Xi(B1) designated 51-0, 51-1, ... 51-(B1). Similarly, the switch 46 receives buffer full signals FB(0), FB(1), ..., FB(B−1), on the lines 52-0, 52-1, ..., 52-(B−1), respectively, which connect from the buffer units BU(0), BU(1), ..., BU(B-1), respectively.

Each of the buffer units BU(0), BU(1), ..., BU(B−1) designated by reference numerals 37-0 through 37-(P−1) provides a bus output B(0), B(1), ..., B(B-1), respectively, on the lines 54-0, 54-1, ..., 54-(B-), respectively, to an Xout switch 47 and receives from switch 47 a "full" signal FXo(0), FXo(1), ..., FXo(B−1), respectively, on the lines 55-0, 55-1, ..., 55-(B−1), respectively.

The Xout switch 47 connects any one of the outputs from the memory bank units 37-0 through 37-(P−1) to any one of the outputs Xo(0) through Xo(P−1) and thence to the output units 42-0 through 42-(P−1) through the lines 50-0 through 50-(P−1), respectively.

In FIG. 5, the function of the Xin switch 46 is to switch input information from the P input ports to any one of the B bank units of memory. Similarly, the function of the Xout switch 47 is to switch output information from the B memory bank units to any one of the P ports. Both the input switch 46 and the output switch 47 function like a cross-bar switch in that any of the P inputs can be switched to any one of the B memory bank units and similarly on the output, any of the B bank units can be switched to any one of the P ports.

Each of the memory bank units 37-p is similar to the memory bank unit 37 as shown in FIG. 3. Each such unit 37 as shown in FIG. 3 includes a plurality of M memory modules similar to the module 31-0 as shown in FIG. 4. While the value of M for each of the bank units of FIG. 5 can be different, the preferred embodiment described has all of the bank units having an equal number, M, of memory modules. The switches operate such that a read operation request to a memory module in a bank unit from a particular port (through the input switch 46) will return the requested data to the same output port through the output switch 47. Similarly, the requested data, as requested by a port, will return the fetched data on the return port at the correct time as requested at the input port. Accordingly, the correct port and the correct time of return are preserved within the FIG. 5 memory system even though each port stores and retrieves data to any or all of the bank units and any or all of the memory modules within a bank unit at different times.

Figure 6:
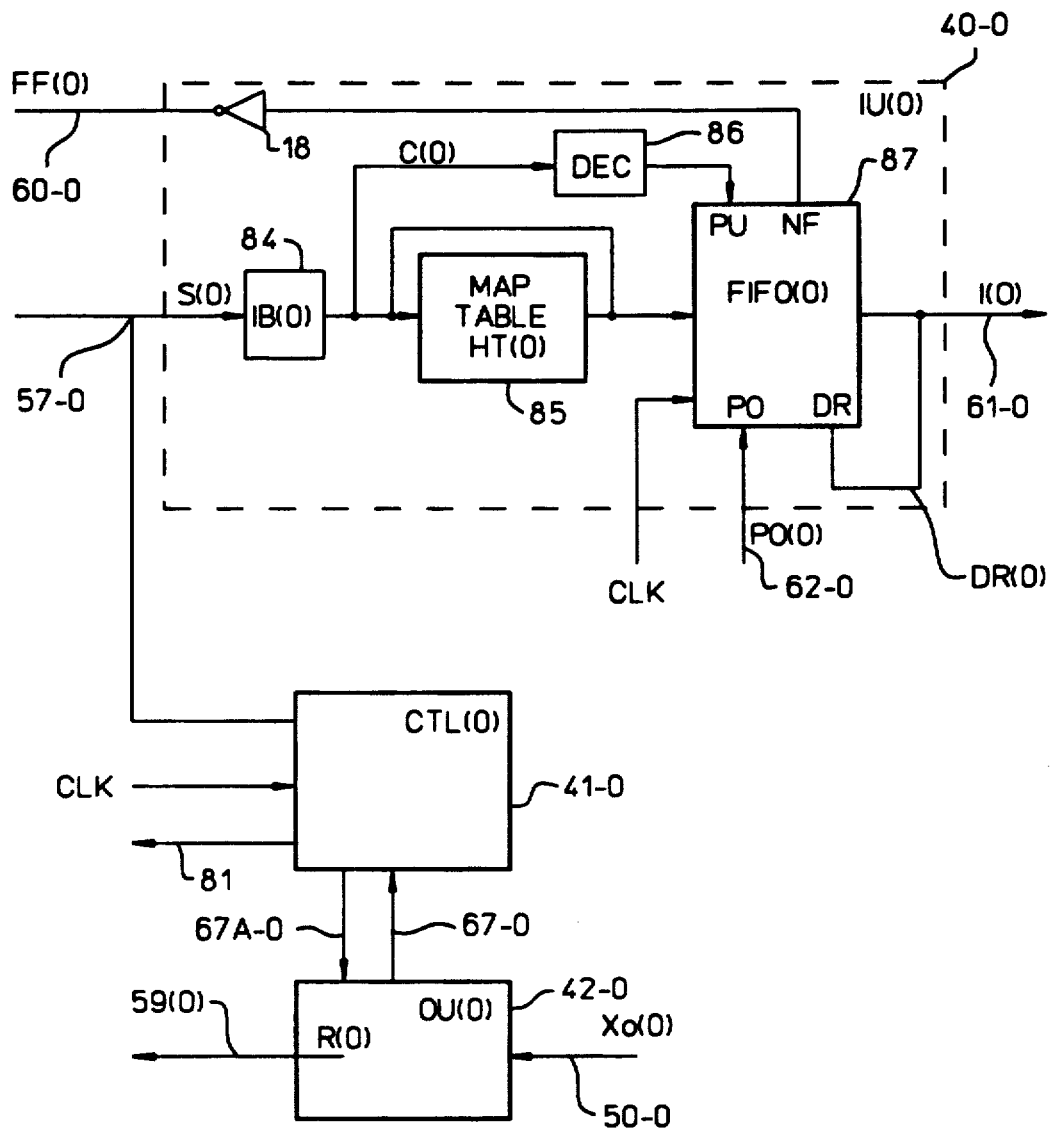
FIG. 6 depicts a typical one of the ports shown in FIG. 5.

Typical Port Unit-FIG. 6

In FIG. 6, the input unit 40-0, the control unit 41-0 and the output unit 42-0 are shown as typical of each of the P sets of input, control and output units of FIG. 5. Specifically, referring to the input unit IU(0), the input bus S(0) together with the tag Ti(0) connect as the input to an input buffer IB(0) 84. The input buffer 84 stores the 32-bit address field A(0), the 32-bit data field D(0), the 2-bit control field C(0), and the 2-bit port field P(0), and the 8-bit tag Ti(0). The tag Ti(0) is generated by the control 41-0.

The output from the buffer 84 is connected to a first in first out (FIFO) buffer 87. A portion of the address bits A(0) are transformed in a map table 85 before storage in the FIFO 87. Certain address bits of the address A(0), the data bits D(0), the control bits C(0), the port bits P(0), and the tag bits T(0) bypass the map table 85 and are stored directly in FIFO 87. The control bits C(0) are decoded in decoder 86 so as to disable a push into FIFO 87 whenever a NOOP is decoded. Accordingly, read, write or other active commands cause a push of the data and addresses into FIFO 87, but NOOP's do not. A pop from the FIFO 87 is enabled by the accept signal PO(0) on line, 62-0 derived from the Xin switch 46 as shown in FIG. 5. Also the FIFO 87 provides the control signal as an output FF(0) on lines 60-0 whenever the FIFO 87 is not able to accept more input data. The FF(0) signal is derived as the inverted not full(NF) signal for example by an inverter gate 18.

In general, input data on the S(0) bus 57-0 from the port 0 is sequentially input into the buffer 84 as frequently as once per cycle unless the control signal FF(0) indicates that the FIFO 87 cannot accept more data. Each cycle, the data input to buffer 84 is pushed into the FIFO 87 unless the input is a NOOP. The address field for each input address in buffer 84 is transformed in map table 85 before storage into the FIFO 87. Whenever the FIFO 87 has active information, the information is automatically provided onto the I(O) bus. When the bank units accept information, the accept signal PO(0) causes a pop from FIFO 87 removing the most recent output and making available the next in order output. The data ready (DR) output from the FIFO 87 is connected as control line into the bus 61-0 and forms part of the I(0) signal connected to the Xin switch 46 of FIG. 5. The DR output from the FIFO 87 of FIG. 6 is designated as the DR(0) signal.

In FIG. 6, the FIFO 87 is like the FIFO's as previously described in connection with FIG. 4. Particularly the FIFO 87 has the push (PU) input from the decoder 86, the pop (PO) input from the PO(0) line, the FIFO not full (NF) output connected through inverter 18 to the full FF(0) line 60-0 and the data ready (DR) output connected as the DR(0) output forming part of the I(0) bus 61-0.

In FIG. 6, the control CTL(0) is shown as typical of the controls 41-0 through 41-(P−1) of FIG. 5. The function of the control CTL(0) of FIG. 5 is to generate the input tag, Ti(0), for input to the input buffer IB(0) 84 each time the processor 26 of FIG. 1 loads information into the buffer 84. The input tag generated by the control CTL(0) is propagated, referring to FIG. 5, through the input unit IU(0), through the Xin switch 46, to a selected one of the bank units 37, through the Xout switch 47 to the corresponding output unit OU(0).

As shown in FIG. 6, the output unit OU(0) receives what previously was the input tag as the output tag To(0) Accordingly, the input tag Ti(0) introduced through the input unit IU(0) returns as the output tag To(0) after propagation through the input switch 46, a bank unit 37, and the output switch 47 of FIG. 5. The input tags are assigned in order and are stored in the CTL(0). Upon return as output tags, the order of the tags as assigned at the input is used to establish the order of the data returned to the port by the output unit 42-0.

The order in which addresses of locations in memory modules 31 and bank units 37 are presented through the input ports 57 may be different than the order in which information is actually stored into and fetched from those locations in the memory modules and the bank units. However, for the same program, the order of accessing must be preserved. In one example, the same program is always accessed through the same port and accesses to the same module are in order of request. The order in which requested (addressed) information is returned to an output port in response to a read operation is the same order that the request for that information was presented to the input port.

The data requested during a read operation specified by the processor 26 of FIG. 1 is accessed from a bank unit 37 of FIG. 5 and is returned to the corresponding output unit 42 of FIG. 5 in a different order than that requested by the processing unit. The output 42 uses the input tag, Ti, and the output tag, To, to insure that the requested order of the data read appears correctly on the output buses 59.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. A pseudo-random access memory computer system comprising:
   a processor;
   a map unit responsive to a plurality of memory access requests provided by the processor for transforming, according to a pseudo-random address transform relation, an input address of each memory access request into an output address having m module bits, the map unit comprising means for computing the m module bits by Boolean matrix multiplication between g input bits of the input address and a predetermined matrix having m columns and g rows, where g is greater than m and a set of m contiguous rows of the matrix is a linearly independent set; and
   a memory unit including a plurality of memory modules each having a plurality of memory locations, the memory unit in electrical communication with the map unit and responsive to the output address provided by the map unit to provide access to a memory module designated by the m module bits, whereby the map unit transforms any given input address to the same output address, the map unit transforms the input address of each memory access request such that not more than one input address is transformed to any given output address, and the map unit transforms the input address of each memory access request such that the memory access requests are distributed approximately equally over time among the memory modules where each memory module receives approximately the same number of memory access requests from the processor as each of the other memory modules.

2. The computer system as in claim 1, wherein each row of the matrix is associated with one of the g input bits, each column of the matrix is associated with one of the m module bits, and the computing means of the map unit comprises means for computing one of the m module bits by:
   a) selecting the column associated with the one module bit,
   b) multiplying each of the g input bits by a respective one of a plurality of elements of the matrix which occupy the selected column to obtain a plurality of products, one for each of the g input bits, and
   c) setting the one module bit to a first value if the plurality of products has an odd number of products having a value of one and setting the one module bit to a second value if the plurality of products has an even number of products having a value of one.

3. The computer system as in claim 1, wherein a submatrix of the matrix comprises linearly independent rows.

4. A pseudo-random access memory computer system comprising:
   a processor;
   a map unit responsive to a plurality of memory access requests provided by the processor for transforming, according to a pseudo-random address transform relation, an input address of each memory access request into an output address having m module bits, the map unit comprising means for computing the m module bits by carrying out (1) Boolean matrix multiplication between g input bits of the input address and a first predetermined matrix having m columns and g rows, where g is greater than m and a set of m contiguous rows of the first matrix is a linearly independent set, to obtain a first result, (2) Boolean matrix multiplication between h input bits of the input address and a second predetermined matrix having m columns and h rows, where h is greater than m and a set of m contiguous rows of the second matrix is a linearly independent set, to obtain a second result, and (3) an EXCLUSIVE-OR operation upon the first and second results to obtain the m module bits; and
   a memory unit including a plurality of memory modules each having a plurality of memory locations, the memory unit in electrical communication with the map unit and responsive to the output address provided by the map unit to provide access to a memory module designated by the m module bits,
   whereby the map unit transforms any given input address to the same output address, the map unit transforms the input address of each memory access request such that not more than one input address is transformed to any given output address, and the map unit transforms the input address of each memory access request such that the memory access requests are distributed approximately equally over time among the memory modules where each memory module receives approximately the same number of memory access requests from the processor as each of the other memory modules.

5. The computer system as in claim 4, wherein each row of the first matrix is associated with one of the g input bits, each column of the first matrix is associated with one of a plurality of bits of the first result, and the computing means of the map unit comprises means for computing one of the bits of the first result by:
   a) selecting the column associated with the one first result bit,
   b) multiplying each of the g input bits by a respective one of a plurality of elements of the first matrix which occupy the selected column to obtain a plurality of products, one for each of the g input bits, and
   c) setting the one first result bit to a first value if the plurality of products has an odd number of products having a value of one and setting the one first result bit to a second value if the plurality of products has an even number of products having a value of one.

6. The computer system as in claim 4, wherein a submatrix of the first matrix comprises linearly independent rows.

* * * * *